Figure 7:
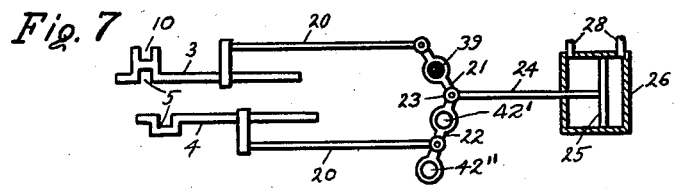

April 16, 1935.  J. J. DRABIN  1,998,274
AUTOMATIC TRANSMISSION
Filed July 9, 1934  2 Sheets-Sheet 1
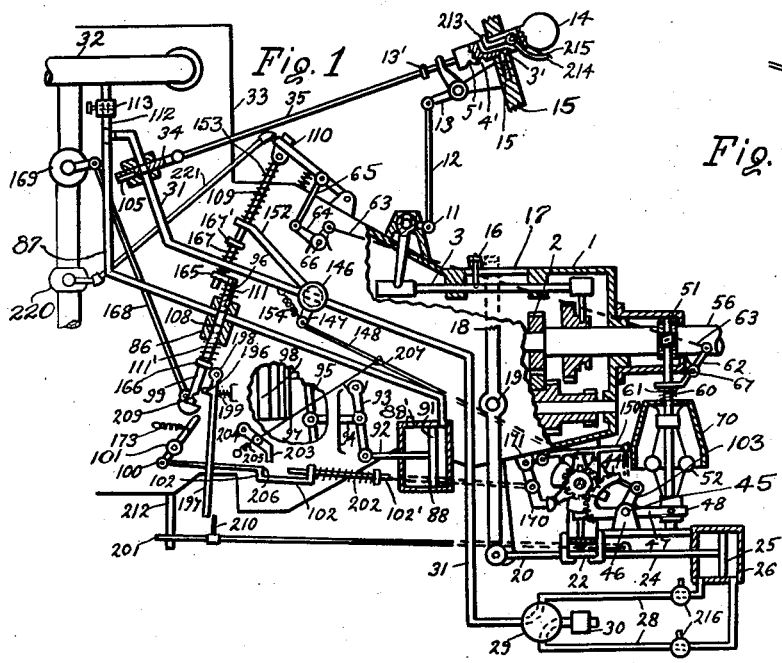
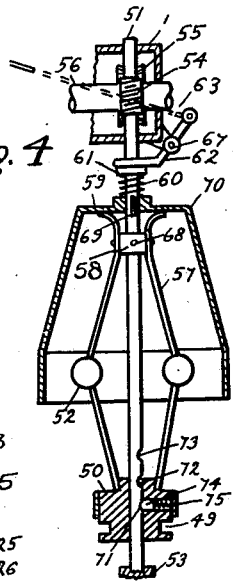
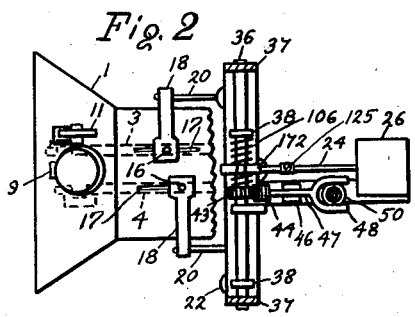
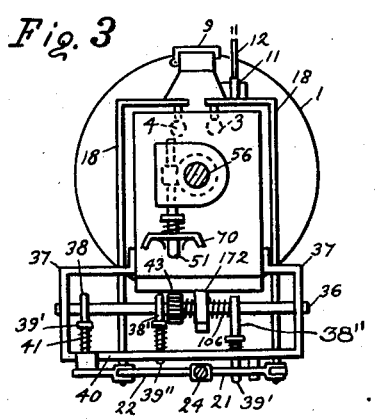
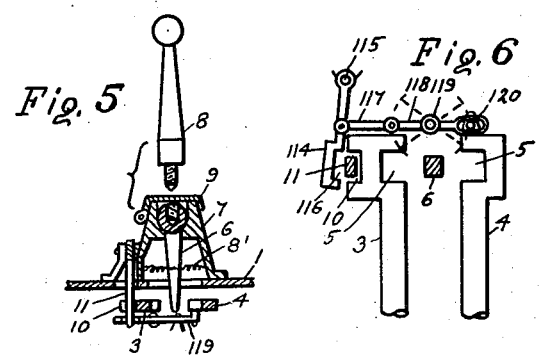
JOHN J. DRABIN
INVENTOR
BY *John P. Nikonow*
ATTORNEY April 16, 1935. J. J. DRABIN 1,998,274
AUTOMATIC TRANSMISSION
Filed July 9, 1934  2 Sheets-Sheet 2

JOHN J. DRABIN
INVENTOR

BY John P. Nikonow
ATTORNEY

Patented Apr. 16, 1935

1,998,274

UNITED STATES PATENT OFFICE 1,998,274

AUTOMATIC TRANSMISSION

John J. Drabin, New York, N. Y.

Application July 9, 1934, Serial No. 734,246

7 Claims. (Cl. 74—336.5)

My invention relates to an automatic transmission and has particular reference to a transmission for an automobile or a similar automotive vehicle.

This is a continuation in part of my application Serial No. 688,339, filed Sept. 6, 1933.

In ordinary automobile transmissions the gear shift is accomplished manually, the operation requiring a certain amount of skill on the part of the driver. The gear shift is made easier by certain improvements, such as an automatic arrangement for synchronizing the respective gears before bringing them into mesh, also by a more or less automatic operation of the engine clutch.

It is desirable, however, to have a fully automatic transmission, in which all the gear shifts, with the exception of the reverse, are accomplished automatically, without any attention from the driver, being controlled by the movement of the vehicle itself.

The object of my invention is to provide such an automatic transmission. For this purpose I provide a vacuum cylinder connected through a valve with the intake manifold of the automobile engine, and I connect this cylinder with the gear shifting rods in the transmission. I provide a mechanism for selectively connecting the cylinder with one or the other of the shifting rods; for controlling the operation of these selective connections I provide a centrifugal governor connected with the driven shaft of the transmission. I also provide operative connections between the governor and the valve of the cylinder in order to operate the proper gear shifts when corresponding predetermined speeds of the driven shaft are reached.

In view of the fact that it is desirable to raise the limits of the speed when more engine power is used, I provide connections between the accelerator pedal and the governor whereby the governor springs can be tightened when the accelerator pedal is depressed.

For the most satisfactory operation of my transmission it is desirable to have a servo motor for operating the engine clutch. I prefer to use for this purpose also a vacuum cylinder connected with the intake manifold of the engine. The controlling valve of this clutch cylinder I connect with the governor in such manner that the clutch is automatically disconnected every time when gears are shifted.

I provide means in my system to revert to the manual gear shifting if necessary, in which case the automatic devices become disconnected.

My invention is more fully described in the accompanying specification and drawings in which—

Figure 8:
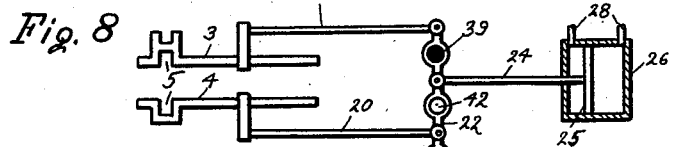
Figure 9:
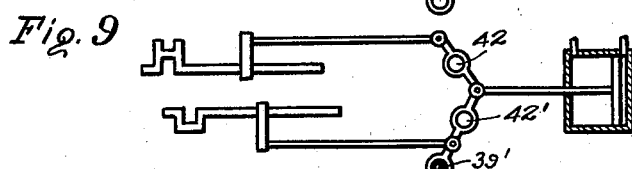
Figure 10:
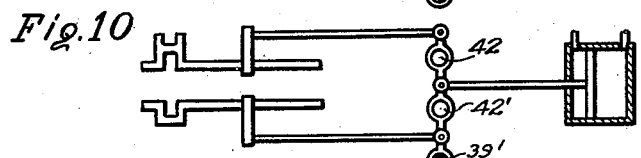
Figure 11:
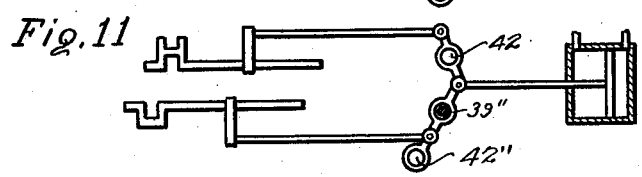
Figure 12:
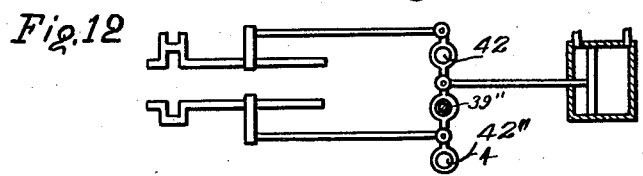
Figure 14:
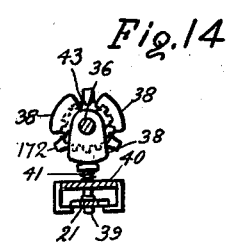
Figure 15:
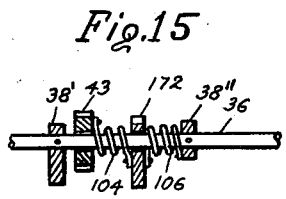
Figure 16:
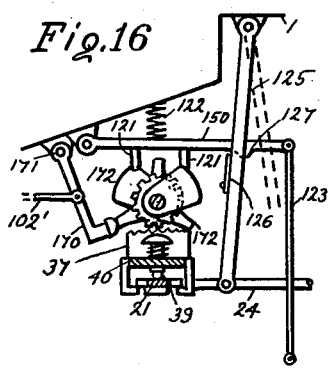
Figure 13:
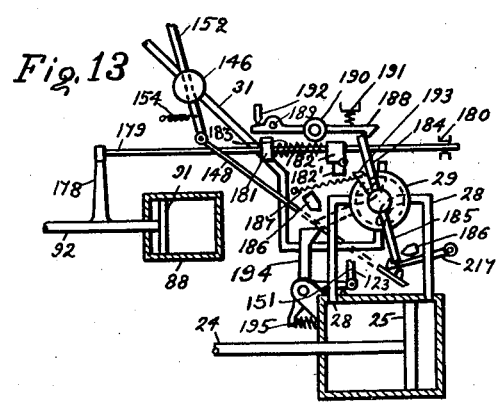

Fig. 1 is a partial elevation of an automobile power plant with my automatic transmission, Fig. 2 is a top plan view of the same partly in section, Fig. 3 is an end view of the same, Fig. 4 is a detail view of the governor, Fig. 5 is a detail view of the removable gear shift handle, Fig. 6 is a detail view of the device for locking the transmission when the reverse gear is in mesh, Fig. 7 is a diagrammatic view of the gear shifting mechanism in the positon when low gear is in mesh, Fig. 8 is a similar view showing the gears in neutral between low and second gears, Fig. 9 is a view showing the second gear in mesh, Fig. 10 is a view showing next transitory neutral position, Fig. 11 is a view with the gears in high gear, Fig. 12 is a similar view of the next neutral position, Fig. 13 is a detail view of the valve control of the gear shifting cylinder, Fig. 14 is an end view of the cam shaft, Fig. 15 is a partial side view of the cam shaft, and Fig. 16 is a detail view of the cam mechanism.

I use for my transmission a standard gear housing or box 1 with ordinary selective sliding transmission gears 2. Gear shifting rods 3 and 4 are provided, the rod 3 being for the reverse and the first speeds, and the rod 4 for the second and third speeds. The rods are provided with slots 5 for the manual gear shifting lever 6 rotatively supported in a bracket 7 and held in a middle or inoperative position by springs 8'. The handle 8 is usually removed and the bracket covered with a lid 9. The reverse gear is shifted manually by a lever 11 engaging a slot 10. A rod 12 connects the lever 11 with a crank 13 in which slides a rod 35 with a bushing 13' and a handle 14 slidably fitted in a dashboard 15. A spring latch 15' engages slots 3', 4' and 5' for the first speed, neutral and reverse.

The rods 3 and 4 have pins 16 passing through slots 17 and connected with the ends of arms 18 pivotally supported on pins 19 at the sides of the box 1. The lower ends of the arms are pivotally connected with links 20, the other ends of which are pivoted to selector bars 21 and 22. These bars are pivotally joined together at the middle point 23 which is also pivoted to the end of a sliding rod 24. The other end of the rod 24 is attached to a piston 25 sliding in a cylinder 26. The ends of the cylinder are connected by a pipe 28 with a four-way valve 29. The third outlet of the valve is connected with the outside air through a filter box 30 filled with metal shavings or similar air filtering material.

The fourth outlet is connected by a pipe 31 with the intake manifold 32 of the engine 33. A valve 34 is placed in the pipe 31 and is connected by a rod 35 with the handle 14 of the reverse gear shift.

A camshaft 36 is rotatively supported in a bracket 37 mounted on the sides of the housing 1. This shaft has three cams 38, 38′ and 38″ spaced 120° apart and adapted to press down selector pins or pivots 39, 39′ and 39″, slidably supported in a guiding bar 40 of the bracket 37. Springs 41 tend to keep the pins in a raised position. When depressed the pins slide into holes 42, 42′ and 42″ in the selector bars 21 and 22. A gear 43 is mounted on the shaft 36 and is in mesh with a gear sector 44 rotatively mounted on a shaft 45 supported in a bracket 46. The other end of the sector arm 47 has a fork 48 engaging a slot 49 on a hub 50 sliding on a vertical shaft 51 of a governor 52. The governor shaft turns on a foot bearing 53 and has a worm 54 on its upper end in mesh with a worm gear 55 mounted on a driven shaft 56 of the transmission. The springs 57 of the governor are pivotally supported on an upper hub 58 which is attached to the shaft 51. The upper ends of the springs flare out under the upper plate 59 of a bell 70. A helical spring 60 is placed between the plate 59 and a sliding bushing 61. A forked end of a lever 62 presses against the bushing 61. The other end of the lever 62 is connected by a rod 63 with a lever 64 connected in turn by a link 65 with an accelerator pedal 110. The latter is connected with a carburetor throttle valve 220 by a rod 221. The lever 64 is mounted on a pin 66, and the lever 62 on a pin 67. The hub 58 and the plate 59 turn with the shaft 51, the hub being fastened with a pin 68, and the plate sliding on a key 69. The bell 70 is a protective housing for the governor balls 52 preventing their excessive outward movement at high speeds.

The shaft 51 has three notches, 71, 72 and 73, corresponding to the first, second and third speeds, the range of the second speed being between the second and third notches, and for the first speed between the first and second. The hub 50 has a transverse hole in which a pin 74 slides being pressed against the shaft by a spring 75.

A cylinder 88 is connected by a pipe 87 with the engine intake manifold 32. A piston 91 is fitted in the cylinder 88 and is connected by a rod 92 with an outside lever 93 connected by a rod 94 with an inside lever 95 engaging a sleeve on a clutch plate 97 of the engine flywheel 98. The atmospheric pressure on the piston 91 disengages the clutch when there is vacuum in the pipe 87, the left side of the cylinder 88 being provided with an atmospheric port 88′. A valve housing 86 is placed in the pipe 87 and has a sliding valve 108. The latter is provided with a bleeder slot 96 for admitting air into the cylinder when the valve is closed. It also has a lug 165 and a retrieving spring 111 which tends to keep the valve open. A second spring 111′ resting against an enlargement 166 limits the movement of the valve. A spring 167 provides a resilient connection between the accelerator pedal and the lug 165 of the valve. The upper end of this spring rests against a knob or enlargement 167′. The valve 108 has an extension 99 connected by a rod 168 with a supplementary throttle valve 169 leading from the carburetor (not shown) to the manifold 32. This valve is opened when the valve 108 is opened. A lever 100 mounted on a pin 101 engages the lower end of this extension 99 when rotating on the pin under action of a spring 173. The other end of the lever 100 is connected with a rod 102 slidably connected with a rod 102′. A spring 202 tends to keep these rods apart thereby deflecting the lever 100 to the right against the tension of the spring 173. The rod 102′ is connected with a lever 170 pivoted on a pin 171 and engaging a triple cam 172 on the shaft 36. The projections on the cam 172 are located midway between the corresponding cams 38′ and 38. A hook 203 resting on a pivot 204 and turning under action of a spring 205 engages a shoulder 206 thereby preventing the rod 102 from moving to the right. A cord 207 connected with the rod 148 releases the rod 102 when the valve 146 is opened. The pipes 31 and 87 merge together into a common pipe 112 provided with a cock 113 which can be closed by hand if it is desired to disconnect the automatic features of the transmission and to operate it manually.

A transmission interlock is provided in order to prevent the reverse from being engaged when the second or third gears are in mesh. For this purpose a lever 114 is provided pivoted on a pin 115 and having a slot 116 adapted to engage the operating end of the reverse gear shift lever 11. The lever 114 is connected by a link 117 with the end of an interlock lever 118 pivoted on a pin 119 between the rods 3 and 4. The other end of the rod 118 has a slot engaging a pin 120 on one end of the rod 4 which operates gears for the second and third speeds. As shown in Fig. 6, any displacement of the rod 4 from its neutral position will cause a pull on the link 117 closing the lever 114 over the gear shift lever 11 thereby locking the latter.

A supplementary valve 146 is placed in the pipe 31 and is connected by an arm 147 and a rod 148 with a lever 103 extending from the arm 47 of sector. The other end of the lever 103 fits under the bushing 50 of the governor in its low position corresponding to a certain minimum speed, turns the lever 103 thereby opening the valve 146. A spring 154 tends to keep the valve closed. An arm 152 extends from the valve 146 slidably engaging the rod 109. A spring 153 opens the valve 146 when the accelerator pedal is depressed.

The pinion 43 turns freely on the shaft 36 and is connected by a spring 104 with a cam 172 which also turns on the shaft 36 and is connected by a spring 106 with the cam 38 (Fig. 15), these springs tending to keep the points of the cam 172 in line with the cams 38, 38′ and 38″.

An arm 150 is pivoted at one end to the housing 1 and has lugs 121 forming a fork engaging the cam 172 with sufficient clearance so as to permit the rocking of the cam between the lugs 121 while one of the cams 38, 38′ and 38″ retains its contact with the corresponding pin 39. The arm 150 is pressed down by a spring 122 and is prevented from a further movement down by a link 123 connected with one arm of a crank lever 194 (Fig. 13) resting against a lug on the side of the cylinder 26. An arm 125 is pivoted at one end to the side of the housing 1, the other end being pivoted to the rod 24. A spring plate or pawl 126 is attached to one side of the arm 125 so that it becomes deflected when passing over a lug 127 on the under side of the arm 150, but is prevented from being deflected by the side of the arm 125 when the latter moves from the right to the left, thereby raising the arm 150 and releasing the cam 172.

The rod 92 has a lug 178 connected with a rod 179 guided by a bearing 180. A bushing 181 is fastened on the rod 179 and another bushing 182 slides on the rod. A spring 183 is placed on the rod and is fastened with its ends to the bushings 181 and 182 (Fig. 13).

The valve 29 has arms 184 and 185. The arm 185 limits the rotation of the valve to 90° between stops 186. A spring 187 tends to keep the valve turned to the left into a position in which the right end of the cylinder 26 is connected with the vacuum pipe 31.

The valve is further retained in this position by a hook 188 pivoted on a pin 189 and provided with a roller 190 in the middle. A spring 191 presses the hook down. Its downward movement is limited by a stop 192. The roller is placed at such distance from the rod 179 that the bushing 182 freely passes under the roller while the larger bushing 181 engages the roller and releases the hook from the arm 184. The bushing 182 has a depending lug 182' which engages a lug 193 on the valve thereby turning it one quarter of a turn until the bushing 182 passes over the lug 193. This happens because the lug 193 is displaced to the right as shown in Fig. 13. The lug 193 and the arms 184 and 185 are connected with the inner rotating core of the valve, the outer shell being stationary and connected with the pipes 28 and 31. The valve is retained in its new position by the end of a lever 194 engaging the arm 185 shown with dotted lines in its new position. A spring 195 tends to turn the lever 194 to the right after it has been deflected by the arm 185. The other end of the lever 194 rests against the lower end of the rod 151 so that the latter, when lowered, turns the lever 194 thereby releasing the arm 185 and permitting the valve to be turned to the left by the spring 187.

A rod 197 is pivoted on a pivot 198 and has a lug 196 pressed against the extension 99 by a spring 199. A slot 209 is located on the extension 99 just below the lug 196 when the valve 108 is supported in the open position by the springs 111 and 111'. The lug 196 engages the slot 209 when the extension 99 is pushed up by the lever 100 thereby retaining the valve 108 in the open position even if the accelerator pedal is depressed. the opening in the valve 108 is made sufficiently large to keep the valve open in its raised position. The lower end of the arm 197 may be engaged by a spring or resilient lug 210 supported on a rod 201 attached with one end to the rod 24 and sliding at the other end in a bearing 212.

The operation of my transmission is as follows.

With the engine standing still (not running), the first or low-gear is in mesh, the pin 39 engaging the bar 21. The reverse gear shift handle is held by the latch 15' engaging the notch 3'. There being no vacuum in the engine manifold, the clutch will be engaged although the valve 108 is open. The automobile being in low gear will have the same effect as if the brakes were applied, so that it will not be necessary to use the emergency brake under ordinary parking conditions. In order to start the engine the clutch pedal is depressed releasing the clutch while the starter is placed in operation. For this purpose the starter switch may be connected with the clutch pedal as described in my application serial No. 688,339, filed Sept. 6, 1934, or the starter may be connected by the ignition switch. As soon as the engine is started and vacuum is built up in the manifold 32, the cylinder 88 will be energized releasing the clutch. The clutch pedal may be then released and will not be needed for the further operation of the automobile as long as the engine is running.

The reverse gear can be used only when the transmission is in low gear due to the transmission interlock shown in Figs. 5 and 6. If it is desired to use the reverse, the handle 14 is pulled out, it being released for movement when the handle is squeezed by the operator's hand thereby turning the lever 214. The spring latch 15' will be pushed out by the pull on the handle 14.

During the first portion of its movement the rod 35 will slide freely through the hole in the lever 13 so that the latter will not move until the bushing 13' reaches the lever. The valve 34 will then be closed and the bleeder slot 105 opened into the pipe 31 thereby admitting air to both sides of the piston 25. The rod 24 can be then moved freely. With the further pull on the handle 14 the gears will pass the neutral point at the notch 4' and then will go into the reverse at the notch 5'. The automatic gear shift will remain inoperative as long as the reverse is used. This is necessary in order to prevent any gear shifting operations from taking place if the speed on the reverse reaches a high point. The clutch will remain engaged as long as the accelerator pedal is depressed which action closes the valve 108, but will be again disengaged as soon as the accelerator pedal is released.

The governor bushing 50 in its lowest position engages the ends of the fork 48 and arm 47. The bushing is held in this position by the pin 74 engaging the notch 71. The pull on the rod 148 by the lever or lug 103 opens the valve 146 against the tension of the spring 154.

When the engine is running, the low gear remains in mesh, and the car will move forward as soon as the accelerator pedal is depressed thereby closing the clutch valve 108. As the speed of the car increases, the governor weights will tend to raise the bushing 50, but will be held by the pin 74 until the speed reaches a value corresponding to the limiting speed at which the second speed is used. At that speed the bushing 50 will be forced out of the engagement with the slot 71 and will jump to the next slot 72 where it will be held. The spring 104 will be wound and placed under tension, but the cam 38, 38' and 38" will remain in contact with the pin 39, as the cam 172 will be held by the lug 121 on the arm 150. The points of the cam 172 being narrow, the corresponding point will slide off the end of the lever 170, which accordingly will become free to turn to the right under pressure from the spring 173, this pressure being transmitted through the rods 102 and 102' and the spring 202. The lever 100, passing under the end of the bar 99, will raise the same until the notch 209 comes in opposition to the lug 196, which will accordingly engage the notch, holding the valve in the open position regardless of the pressure from the accelerator pedal, as the passage of the valve 108 is sufficiently large to keep the pipe 87 open in these positions. The pipe 87 will be now open, so that the piston 91 will move to the right releasing the engine clutch. The movement of the rod 92 will bring the pivoted block 182' against the lug 193 of the valve 29, not moving the latter, however, the arm 184 being held by the hook 188. The spring 183 will be compressed until the block 181 raises the roller 190 releasing the hook 188. At the end of the travel of the piston 91, therefore, when the engine clutch is fully released, the valve 29 will snap through a quarter of a turn under pressure from the spring 183 which is much stronger than the spring 187, the lug 185 coming to rest against the post 186, deflecting in its movement the lever 194 and passing above its end. The arm of the hook 188 will come to rest against the support 192. In this position of the valve the block 182' will slide over the lug 193. The left side of the cylinder 26 will be now connected with the vacuum pipe 31 and the right side with the outside air, so that the piston 25 will move to the left bringing the gears into neutral (Fig. 8). The gears cannot move into the reverse from this position as the reverse handle 14 is locked by a latch 213 connected with a handle 214 pivoted in the handle 14 and kept in a locked position by a spring 215. It becomes released only when the handle 14 is taken by the operator for pulling the handle out and connecting the reverse gear, the handle 214 being then pressed against the handle 14.

Upon completion of the movement of the piston 25 to the left when the gears are brought into the neutral position, the latch spring 126 raises the arm 150 thereby releasing the cam 172. The cams will turn to the position corresponding to the notch 72 of the governor, making one third of a turn, and the next lug of the cam 172 will be caught by the returning arm 150 with its lugs 121. The upward movement of the rod 123 will turn the lever 124 thereby releasing the valve 29, which will return to its original position by making quarter of a turn to the left. The arm 184 will be caught under the hook 188. The valve 108 will remain open all this time as the spring 210 deflects while passing to the other side of the arm 197. With the valve 29 in the left position, the piston 25 will move to the right, shifting the second gear into mesh as per Fig. 9. The speed of the movement of the piston 25 can be adjusted by turning the throttle valves 216 in the pipes 28. Upon completion of the movement of the piston 25 the spring 210 will engage the arm 197 releasing the extension 99 from the lug 196 and permitting the valve 108 to be moved down and closed by the pressure from the accelerator. The engine clutch will be therefore engaged by the pressure from the clutch spring. Prior to the release of the rod 99 the next lug of the cam 172 will pass under the lever 170 turning the lever 100 to the right. In this position of the mechanism the car will continue to travel on the second gear. With the further increase of speed, when it reaches the limiting value for shifting to the high gear, the governor will pull the bushing 50 off its place, turning the cam 172 and turning thereby the lever 100. The valve 108 will be open, and the sequence of gear shifting operations will again take place until the transmission will be changed to the high gear (or third speed), with the pin 39'' replacing the pin 39'.

It may be noted that the pins are being changed only when the selector bars 21 and 22 are aligned for the neutral position.

The car will continue to travel on the high gear with the governor locked on the notch 73. It will be prevented from any further movement upward by the bell 70 holding the weights 52.

Whenever the accelerator pedal is released, the valve 108 will return into its open position under action of the spring 167, the notch 209 not reaching, however, the lug 196. The vacuum pipe 87 being open into the cylinder 88, the engine clutch will be released, and the car will coast with the engine disconnected from the transmission. The valve 146 being closed, the hook 217 (Fig. 13) will be pulled up by the rod 148, engaging the end of the arm 185 and locking the valve 29 in the operative position for the gears in mesh. The movement of the piston 91 to the right, therefore, cannot turn the valve 29, the block 182' resting against the lug 193, and the spring 183 being compressed. The raising of the arm 188 by the block 181 will not change the conditions as long as the hook 217 engages the arm 185. The gears can be shifted, however, if desired, from the third to the second gear, when the car speed is approximately correct for such shift, by depressing the accelerator pedal for a short time. This action will release the valve 29 from the hook 217. The governor bushing 50, being pushed down by the springs 57, will turn the arm 47 with the gear sector 44, turning thereby the cam 172, thus beginning the series of gear shifting operations as described above, except that the pin 39' will take place of the pin 39''. With the further slowing down of the car and with the accelerator depressed (for instance, when climbing a hill), the gears will be again changed, from the third to the second, when the car speed reaches a predetermined value.

If the car is coasting with the accelerator pedal released then the valve 108 is open thereby keeping the clutch released. The valve 146 is closed by the spring 154 thereby rendering the motor (cylinder) 26 inoperative. The hook 203 holds the rod 102 preventing the arm 100 from moving even when the lever 170 becomes released. The hook 217 holds the valve 29 preventing its movement even when the piston 91 moves.

The speeds at which the governor changes the gears varies for different accelerator positions. This is accomplished by changing the tension of the springs 57 by means of a lever 62 pressing on the curved ends of the springs 57, the lever 62 being turned by the lever 64 through the rod 63, the lever 64 being connected with the accelerator pedal 110 by a link 65. With this arrangement greater speeds are required for changing gears from lower to higher when greater engine power is used.

The automatic transmission may be rendered inoperative by closing the cock 113. The handle 8 can be then inserted in the ball of the shifting lever 6 for manual gear shifting. The handle 8 can be also used for engaging the reverse gear, in which case the handle 214 must be tied to the handle 14.

My system has the following important advantages:

1. The driver does not use his hands for shifting gears, except for the reverse. He uses only the brake and accelerator pedals, all the gear shifting being performed automatically at proper speeds. Only one foot is used, either for depressing the accelerator, or for the brake pedal (or starter).

2. The superfluous pedals and handles can be removed from the driver's side thereby leaving the space clear for more passengers.

3. The engine clutch is automatically released when the accelerator pedal is released, thereby eliminating the use of a free wheeling clutch.

4. The range of speeds at which the gear shifting takes place is varied automatically with the variations in the engine power used.

5. Standard transmission gears are employed with a standard clutch releasing air cylinder.

6. The synchronization of the gears for shifting is made easier as they are brought into the neutral between the shifts.

7. There is no danger of the engine being stalled, as the engine clutch becomes automatically disengaged when the speed drops very low.

8. The engine stops with the low gear in mesh, so that no hand brake is needed for parking.

9. The starting up hill is made easy because the engine picks up directly from the low gear, no emergency brake being needed. The left foot can be used for releasing the foot brake while the right foot depresses the accelerator.

I claim as my invention:

1. In an automatic transmission for an automobile, the combination with a housing containing transmission gears adapted to be connected for different gear ratios, of sliding members for shifting said gears, a reversible motor, a centrifugal governor operatively connected with the driven shaft of said transmission, means to control the operation of said motor by said governor, connections between said motor and said sliding members, levers included in said connections, removable pivots for said levers, and means to operate said pivots by said governor thereby connecting different gear shifts with said motor, said motor being adapted to connect said gears when moving in one direction and to disengage said gears when moving in the other direction.

2. In an automatic transmission for an automobile, the combination with a housing containing transmission gears adapted to be selectively connected for different gear ratios, of sliding members for shifting said gears, each of said members being adapted to shift different gears depending on the direction of its movement, a reversible motor, a centrifugal governor operatively connected with the driven shaft of said transmission, means to control the operation of said motor by said governor, operative connections between said motor and said sliding members, means to selectively change said connections so as to connect different sliding members with said motor and to obtain different directions of movement of said members for the same direction of movement of said motor, one direction of movement of the motor being for engaging said gears and the other direction being for disengaging the gears, and means to control said change of connections by said governor.

3. In an automatic transmission for an automobile, the combination with a housing containing transmission gears, of sliding rods in said housing for shifting said gears for different gear ratios, levers operatively connected with said rods, a motor connected with said levers, said levers being provided with variable pivoting points, a centrifugal governor operatively connected with the driven shaft of said transmission, means operated by said governor for selective changing of said pivoting points thereby changing the operative connections between said motor and said gears through said rods, means to control said motor by said governor, and means for manual shifting of the reverse gear of said transmission.

4. In an automatic transmission for an automobile, the combination with a housing containing transmission gears, of sliding rods in said housing for shifting said gears for different gear ratios, a motor, levers connecting said motor with said rods, said levers being provided with variable pivoting points, means to selectively change said pivoting points for changing the operative connections of said motor with said gears through said rods, and means to control said change of pivoting points and the operation of said motor by the rotational velocity of the driven shaft of said transmission.

5. In an automatic transmission for an automobile, the combination with a housing containing transmission gears adapted to be connected for different gear ratios, of sliding members for shifting said gears, a reversible motor, a centrifugal governor operatively connected with the driven shaft of said transmision, means to control the operation of said motor by said governor, connections between said motor and said sliding members, levers included in said connections, removable pivots for said levers, a cam shaft adapted to operate said pivots, means to operate said cam shaft by said governor thereby changing pivoting points of said levers, said levers being adapted to connect different gear shifts with said motor for said different pivoting points, and means to disconnect said transmission from the engine of said automobile when said gears are being shifted.

6. An automatic transmission for an automobile, in combination a housing containing transmission gears adapted to be selectively connected for different gear ratios, a motor, a centrifugal governor operatively connected with the driven shaft of said transmission, levers operatively connecting said motor with said gears, means to change the arrangement of said levers by said governor for different gear ratios, means to control the operation of said motor by said governor, and means to bring said gears into the neutral position by said motor for each change of said lever arrangements by said governor.

7. An automatic transmission for an automobile having a housing containing transmission gears adapted to be connected for different gear ratios, sliding members for shifting said gears and a driven shaft extended from said transmission, a motor, a centrifugal governor operatively connected with said driven shaft, levers operatively connecting said motor with said sliding members, means to change the arrangement of said levers by said governor for different gear ratios, and means to control the operation of said motor by said governor.

JOHN J. DRABIN.